: 3,245,774
HALOALKYL ESTERS OF N-SUBSTITUTED
HALOPHENYLCARBAMIC ACID
John H. Bachmann, Akron, Ohio, assignor, by mesne assignments, to Pittsburgh Plate Glass Company
No Drawing. Filed May 14, 1957, Ser. No. 658,978
5 Claims. (Cl. 71—2.6)

The present application is a continuation-in-part of my application Serial No. 417,967, filed March 22, 1954, and now abandoned, which application was a continuation-in-part of my application Serial No. 376,986, filed August 27, 1953, now abandoned.

The present invention pertains to the novel class of compounds which are haloalkyl esters of N-substituted chlorophenylcarbamic acids, notably the chloroalkyl esters.

According to the present invention, a novel group of compounds have been discovered which are represented by the following basic structural formula:

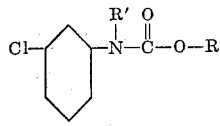

wheren R is the residue of a halogenated aliphatic monohydric alcohol and R' is preferably hydrogen, but may be an alkyl, haloalkyl, cycloalkyl, alkoxy, aryl, alkenyl group or other like monovalent radical. Besides containing a chlorine the phenyl ring may be further substituted with additional halogen atoms, notably chlorine atoms, or it may contain monovalent radicals such as alkyl, alkoxy, alkenyl, nitro, cyano, etc., groups; any combination of two or more of such substituents may be present, e.g., the phenyl ring may contain both an alkyl group and an alkoxy group as well as the requisite chlorine atom.

Compounds wherein R in the above formula is the residue of a mono-chlorinated, saturated, lower aliphatic alcohol, typically aliphatic alcohols containing 2 to 4 carbon atoms which have but one chlorine atom provide a desired sub-class. Compounds wherein the chlorine is attached to a carbon atom which is remote from the ester linkage are especially desired, with those compounds wherein the chlorine is linked to the carbon atom once removed from the ester linkage, such as esters of 2-chloroethanol-1, being preferred.

A further preferred class are those compounds, which besides being derived from alcohols such as 2-chloroethanol, as described hereinbefore, contain a chlorine atom in the metal position of the phenyl ring. These compounds may be considered to have this basic chemical structure:

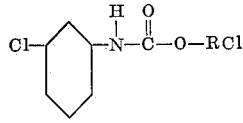

wherein RCl is the residue of a monochlorinated alcohol, containing the chlorine atom on a carbon atom having only hydrogen atoms linked thereto.

Among the polyhaloalkyl esters, and especially the polychloroalkyl esters, those derived from the halogenated alcohols are favored. Especially valuable are the esters of alcohols having at least one halogen atom linked to a carbon atom other than the carbon atom to which the hydroxyl group is attached. It is often desirable to provide esters wherein the hydroxyl and each halogen group is linked to different carbon atoms as when no one single carbon atom of the alcohol is linked to more than one hydroxyl or halogen group, e.g., esters of 1,3-dichloropropanol-2 (α-glycerol dichlorohydrin).

Preparation of the contemplated compounds is accomplished by reacting a haloformate of a chlorinated alcohol with a chloroaniline, notably while making provision for removing the evolved hydrogen halide. In the alternative, reaction of a chlorinated alcohol with chlorophenyl isocyanate also will provide the desired compounds.

Alcohols which are used in either of the above processes are halogenated, particularly chlorinated, saturated aliphatic monohydric alcohols (alkylene chlorohydrins) and include 2-chloroethanol-1, 2-chloropropanol-1, 1-chloropropanol-2, 3-chloropropanol-1, 3-chlorobutanol-2, 1-chloro-2-methylpropanol-2, and the higher molecular weight alkylene chlorohydrins, as well as corresponding bromo-, iodo- and fluoro-hydrins. Also, 2,2-dichloroethanol-1, 1,3-dichloropropanol-2, 2,3-dichloropropanol-1, tertiary dichlorobutyl alcohol, isopral, trichloroethyl alcohol, trichloro-tertiary butyl alcohol as well as the corresponding bromo-, ido- and fluoro-alcohols such as iotone, tribromoethanol, tribromotertiary butyl alcohol, etc.

Chloroanilines employed either to provide the chlorophenylisocyanate or to react with the haloformate include monochloroanilines such as metachloroaniline, orthochloroaniline and parachloroaniline; dichloroanilines such as 2,5-dichloroaniline, 3,4-dichloroaniline, etc.; trichloroanilines including 2,3,5-trichloroaniline; tetrachloroanilines; pentachloroaniline. Also useful are alkylchloroanilines, particularly wherein the alkyl group contains 1 to 5 carbon atoms such as 2-methyl -5-chloroaniline, 2-ethyl-5-chloroaniline, 2-amyl-3-chloroaniline, and the like. Other chloroanilines wherein the phenyl ring contains one or more alkyl, alkoxy, nitro, cyano groups, and halogen substituents such as bromine, are contemplated, for example, 2-methoxy-3-chloroaniline, 2,3-dimethoxy-5-chloroaniline and 2-nitro-3-bromo-5-chloroaniline. As a general rule all chloroanilines wherein at least one reactive hydrogen is linked to the nitrogen atom of the amino radical are suitable including N-alkyl-chloroanilines, N-aryl-chloroanilines and N-alkoxy-chloroanilines.

In the haloformate process, essentially equimolecular quantities of the haloformate of a halogenated alcohol and a chloroaniline are brought into contact and permitted to react, preferably while removing or chemical binding the hydrogen halide evolved by the reaction. Incorporating a hydrogen halide acceptor, such as sodium hydroxide, in the reaction mixture serves to chemically bind the evolved hydrogen halide and thereby facilitate the course of the reaction. Sufficient hydrogen halide acceptor is usually added such that all evolved hydrogen halide will be chemically bound; this normally requires one mole of hydrogen halide acceptor per mole of either reactant.

A wide variety of organic and inorganic bases are suitable hydrogen halide acceptors. Inorganic basic compounds include the oxides, hydroxides, carbonates and bicarbonates of sodium, potassium, calcium, barium, strontium and magnesium or other alkali earth metals or alkali metals. Organic bases which serve the desired purpose include pyridine, quaternary ammonium bases such as trimethyl phenyl ammonium hydroxide and the like. With inorganic bases, aqueous solutions or aqueous dispersions of finely divided particles are used.

The chloroaniline itself may be used to chemically bind the evolved hydrogen halide by permitting formation of its hydrohalide. If recourse to such expediate is had, it is necessary to employ approximately a 100 percent mole excess of the chloroaniline in order for the reaction to proceed stoichiometrically. In the event that the hydrohalide is insoluble in the reaction medium and the desired product is soluble, it is frequently possible to separate the hydrohalide by filtration, centrifugation, etc., and regenerate the separated hydrohalide with alkaline materials such as NaOH with the resulting chloroaniline being recycled to the reaction medium.

Inert, liquid organic diluents are frequently incorporated in the reaction mixture to facilitate agitation and handling of the product. Diluents which are used include benzene, halogenated hydrocarbons, notably chlorinated hydrocarbons among which are carbon tetrachloride, perchloroethylene, ethylene dichloride, etc.; xylene, toluene, and methyl isobutyl ketone. Other organic liquids which are inert, i.e., organic materials which do not react under reaction conditions, are suitable. In general, such diluents are those which are free from reactive hydroxy or amino groups.

All the reagents are preferably reacted in the liquid phase and to this end temperatures are selected which are above the freezing point of the reaction medium. Such temperatures fall between about 0° C. to 50° C., more notably between 0° C. and 20° C.

These haloalkyl esters of N-chlorophenylcarbamic acids are generally low melting solids although sometimes liquid at room temperatures. They are useful, for example, as herbicides, notably to combat weed growth.

The following examples illustrate the manner in which the contemplated compounds may be satisfactorily prepared.

*Example I*

To a 2-liter, round bottom, three-necked flask, equipped with a motor-driven agitator, adaptor, two separatory funnels and a thermometer was added a mixture comprising 141.6 grams (1.0 mole) of 2-methyl-5-chloroaniline, 250 milliliters of benzene and 150 milliliters of water. While vigorously agitating this mixture, 157.3 grams (1.1 moles) of 2-chloroethyl chloroformate and 176 grams of an aqueous solution of sodium hydroxide containing 1.1 moles of sodium hydroxide were added simultaneously in a drop-wise manner from different separatory funnels to the mixture in the flask over a period of 70 minutes. The reaction temperature was between 10° C. and 19° C. during the addition of such materials.

Approximately midway through the addition, another 150 milliliters of benzene and 100 milliliters of water were added to the flask. At the conclusion of the addition, still another 150 milliliters of benzene and 50 milliliters of water were added and the agitation of the mixture was continued for 60 more minutes.

The resulting reaction mixture was then removed from the flask and filtered, the solid product remaining on the filter being rinsed with about 50 milliliters of benzene and then dried. This solid weighed 157.3 grams. Concentration of a filtrate to recovery product therein provided a total yield of product weighing 226.0 grams.

Thereafter, the combined products obtained from the filtrate and solids removed by filtration, were dissolved in 450 milliliters of hot benzene, filtered to remove insoluble impurities, and cooled to recover a purified product. The solid resulting from the cooling was separated and the resulting filtrate was further cooled and the solvent removed by evaporation. A total of 185.6 grams of product melting between 89.2 and 89.8° C. was obtained. This product was 2-chloroethyl-N-2-methyl-5-chlorophenylcarbamate. Analysis for the nitrogen content of the product showed it to contain 5.75 percent of nitrogen as compared with a theoretical content of 5.63 percent.

*Example II*

Into a 1-necked flask was placed 149.0 grams (0.971 mole) of 3-chlorophenylisocyanate and 78.1 grams (0.971 mole) of ethylene chlorohydrin. The flask was swirled to mix the contents. A drying tube filled with Drierite was placed in the neck of the flask and a thermometer was disposed in the mixture within the flask.

The temperature of the contents of the flask immediately rose until the temperature reached 110° C. when contents of the flask were immersed in an ice bath until the temperature fell to 80° C. Then, heat was gently applied and the mixture maintained at 95 to 100° C. for approximately 2.5 hours.

After standing for several hours, the reaction product was melted and dissolved in 300 cubic centimeters of methylene chloride. This solution was washed successively with three 50 cubic centimeter portions of water, one dilute hydrochloric acid wash and an additional water wash in a separatory funnel. The washed methylene chloride solution was filtered into a 500 cubic centimeter flask which was connected to a Claisen-type distillation head. While heating the flask on a steam bath, the methylene chloride was filtered off, first at atmospheric pressure and then under vacuum. Eventually, the contents of the flask were pumped for one hour at 85 to 90° C. and at a pressure of 5 millimeters of mercury by bubbling a slight stream of nitrogen through the system to remove the last traces of methylene chloride.

The product remaining in the flask was an amber colored oil when warm and a light brown waxy solid when cool. A yield of 220.6 grams was obtained and this product had a set point of 44.95° C. The product was 2-chloroethyl N-3-chlorophenylcarbamate. Analyses of the product showed it contained 28.05 percent chlorine; 6.0 percent nitrogen; 18.0 percent $CO_2$.

*Example III*

Into a 500 cubic centimeter, round-bottomed flask was introduced 102.3 grams (0.667 mole) of meta-chlorophenyl isocyanate. The flask was fitted with a Drierite tube, thermometer and dropping funnel. From the latter, 86.1 grams (0.667 mole) of 1,3-dichloropropanol-2 was added over a 2 hours period. Occasionally, the contents of the flask were swirled and at the conclusion of the alcohol addition the mixture had a refractive index of 1.5293 at 20° C.

For about 17 hours gentle heat was applied to this mixture at about 110° C., and after about 21.5 hours, the refractive index of the mixture was constant at $n^{20}D = 1.5648$. The product was then dissolved in 200 cubic centimeters of methylene chloride, washed twice with 90 cubic centimeter portions of INHCl and thrice with distilled water, and thereafter filtered. This was followed by heating to an ultimate temperature of 120–130° C. at 5 millimeters' mercury pressure to remove by topping volatiles such as methylene chloride.

A viscous, light-brown liquid, $n^{20}D = 1.5662$ weighing 180.1 grams was recovered. Upon analysis, it was found to contain 36.2 percent chlorine, 4.6 percent nitrogen and 15.4 percent $CO_2$.

As indicated, the contemplated compounds are particularly used as herbicides. Moreover, some of the compounds, notably 2-chloroethyl N-3-chlorophenyl carbamate, not only possess considerable herbicidal activity but also possess selective herbicidal property. This is, they are effective in combatting one type of plant growth and not the next.

When used as herbicides, the contemplated compounds are normally applied in a mixture with an inert carrier either as a liquid or solid composition. Such compositions are generally formulated such that the concentration of the active material permits considerable latitude in the quantity of material which may be applied in the field without encountering overdosages. Compositions wherein the contemplated compounds constitute from about 0.1 to 30 percent by weight thereof normally satisfy this requirement.

Liquid compositions may be prepared by dissolving the contemplated compound in a suitable hydrocarbon solvent, among which are xylene, toluene, gasoline, kerosene or other hydrocarbons, preferably those having densities lower than that of water, or with alcohols, ethers, ketones and esters containing up to about 10 carbon atoms which esters are used as industrial solvents, such as ethyl alcohol, methyl alcohol, isopropyl alcohol, butyl alcohol, ethyl ether, acetone, etc.

Also a surface active or wetting agent may be applied to the solution to achieve an emulsifiable system. Several such wetting agents include sodium alkylaryl sulfonates, sulfonated dicarboxylic acid esters such as dioctyl sodium sulfosuccinate and alkyl naphthalene sulfonic acids. This emulsifiable system may be mixed with water to provide aqueous dispersions containing approximately 0.1 to 5.0 percent or higher by weight of the contemplated compounds. Such emulsified systems are applied as a spray by using specified low-gallonage sprayers or conventional sprayers. The wetting agents' concentration usually varies between 10 to 30 percent by weight of the solvent and herbicide, depending on the amount needed to maintain an emulsion.

Emulsions which have a density that approximates that of water are preferred because upon mixing with water, the tiny droplets of the emusion remain well dispersed. When a system has a density that does not vary by more than 5 percent from the density of water, it is considered to satisfy this requirement.

Aqueous solutions may be provided if a water soluble solvent for the carbamate, such as an alcohol or an acetone, is used to dissolve the carbamate.

Solid type formulations may be prepared for example by spraying the carbamate onto a highly absorbent solid diluent, such as highly absorptive silica. This coated diluent is then further diluted by blending with a solid such as clay, talc, silica, bentonite, diatomaceous earth, chalk, wood, flour, finely divided calcium silicates, finely divided sodium silicates, and the like, such that a dust results which contains from 5 to 25 percent by weight of the carbamate. Wetability may be imparted to the solid formulations by addition of a suitable wetting agent, such as those described with respect to liquid formulations. Also solid formulations may be achieved by grinding the carbamate in a hammer mill with any of the aforedescribed solid diluents.

Although the present invention has been described with reference to specific details of certain embodiments thereof, it is not intended that such details shall be regarded as limitations upon the scope of the invention except insofar as enumerated in the appended claims.

I claim:

1. An herbicidal composition comprising 2-(1-chloropropyl) N-(3-chlorophenyl) carbamate and a carrier, said compound being present in said composition in a phytotoxic concentration.

2. An herbicidal composition comprising an aqueous emulsion of 2-(1-chloropropyl) N-(3-chlorophenyl) carbamate, said compound being present in said composition in a phytotoxic concentration.

3. An herbicidal composition comprising 2-(1-chloropropyl) N-(3-chlorophenyl) carbamate, and a non-solvent fluent carrier, said compound being present in said composition in a phytotoxic concentration.

4. An herbicidal composition comprising a solution of 2-(1-chloropropyl) N-(3-chlorophenyl) carbamate in an organic solvent, said compound being present in said composition in a phytotoxic concentration.

5. As a new composition of matter, 2-(1-chloropropyl) N-(3-chlorophenyl) carbamate.

References Cited by the Examiner

UNITED STATES PATENTS

| 2,734,911 | 2/1956 | Strain | 260—471 |
| 2,784,071 | 3/1957 | Garman et al. | 260—471 |

OTHER REFERENCES

Adams et al., Chem. Abst., 17, 2112 (1923).
Beilstein, 12, 320–1 (1929).
McKay et al., J. Org. Chem., 16, 1832 (1951).
Thompson et al., Botanical Gazette, vol. 107, 490 to 493, 496, 497 (1946).

LORRAINE A. WEINBERGER, *Primary Examiner.*

NATHAN MARMELSTEIN, CHARLES B. PARKER, IRVING MARCUS, *Examiners.*